United States Patent [19]

Bock et al.

[11] 4,292,653
[45] Sep. 29, 1981

[54] METHOD AND CIRCUIT FOR READING-OUT DATA FROM A TELEVISION PICKUP (IMAGE SENSOR)

[75] Inventors: Gerd Bock, Seeheim; Herbert Zettl, Erfelden; Hans-Wilhelm Zappen, Bensheim; Friedrich Zimmermann, Rossdorf, all of Fed. Rep. of Germany

[73] Assignee: Robert Bosch GmbH, Stuttgart, Fed. Rep. of Germany

[21] Appl. No.: 128,441

[22] Filed: Mar. 10, 1980

[30] Foreign Application Priority Data

Apr. 2, 1979 [DE] Fed. Rep. of Germany ....... 2913116

[51] Int. Cl.³ .......................................... H04N 5/02
[52] U.S. Cl. .................................. 358/140; 358/11; 358/213
[58] Field of Search .................... 358/140, 11, 213

[56] References Cited

U.S. PATENT DOCUMENTS 3,830,971 8/1974 van de Polder .................. 358/140
3,970,776 7/1976 Kinuhata ........................... 358/140

*Primary Examiner*—Howard W. Britton
*Attorney, Agent, or Firm*—Frishauf, Holtz, Goodman & Woodward

[57] ABSTRACT

A method and circuitry for reading out data from a TV pickup (image sensor) designed for the 525-line television standard, and operated in accordance with a line interlace process by once-repeated read-out of each line. In order to adapt the TV pickup (image sensor) to a 625-line television standard, every third line scan is repeated twice, i.e., every third line is read out three times.

Both analog and digital circuits are presented.

11 Claims, 3 Drawing Figures

| 1 LINE | 2 SENSOR LINE 1st HALF-FRAME | 3 2nd HALF-FRAME | 4 OUTPUT LINE | 5 | 6 AVERAGE AFTER PAL INTEGRATION |
|---|---|---|---|---|---|
| 1 | | | | | |
| 2 | | | | | |
| 3 | | | | | |
| 4 | ① | | 1 | | |
| 5 | | ② | | | |
| 6 | [1] | | 1 | | |
| 7 | | [2] | | 2 | 1,0 |
| 8 | ③ | | (3+◇1)⁣:2 | | 1,5 |
| 9 | | △2 | | 2 | 2,0 |
| 10 | [3] | | 3 | | 2,5 |
| 11 | | ④ | | 4 | 3,0 |
| 12 | ⑤ | | (5+◇3):2 | | 3,5 |
| 13 | | [4] | | 4 | 4,0 |
| 14 | [5] | | 5 | | 4,5 |
| 15 | | ⑥ | | (6+◇4):2 | 4,5 |
| 16 | △5 | | 5 | | 5,0 |
| 17 | | [6] | | 6 | 5,5 |
| 18 | ⑦ | | 7 | | 6,0 |
| 19 | | ⑧ | | (8+◇6):2 | 6,5 |
| 20 | [7] | | 7 | | 7,0 |
| 21 | | [8] | | 8 | 7,5 |
| 22 | ⑨ | | (9+◇7):2 | | 7,5 |
| 23 | | △8 | | 8 | 8,0 |
| 24 | [9] | | 9 | | 8,5 |
| 25 | | ⑩ | | 10 | 9,0 |
| 26 | ⑪ | | (11+◇9):2 | | 9,5 |
| 27 | | [10] | | 10 | 10,0 |
| 28 | [11] | | 11 | | 10,5 |
| 29 | | ⑫ | | (12+◇10):2 | 10,5 |
| 30 | △11 | | 11 | | 11,0 |

○ = LINE CONTAINING VIDEO INFORMATION

□ = BLANK LINE (CONTAINS NOISE)

△ = SUPPLEMENTARY BLANK LINE READ-OUT (FOR FORMAT ADAPTATION)

◇ = SUPPLEMENTARY ADDED LINE (FOR REDUCING INTERLACE ERROR)

Fig.1

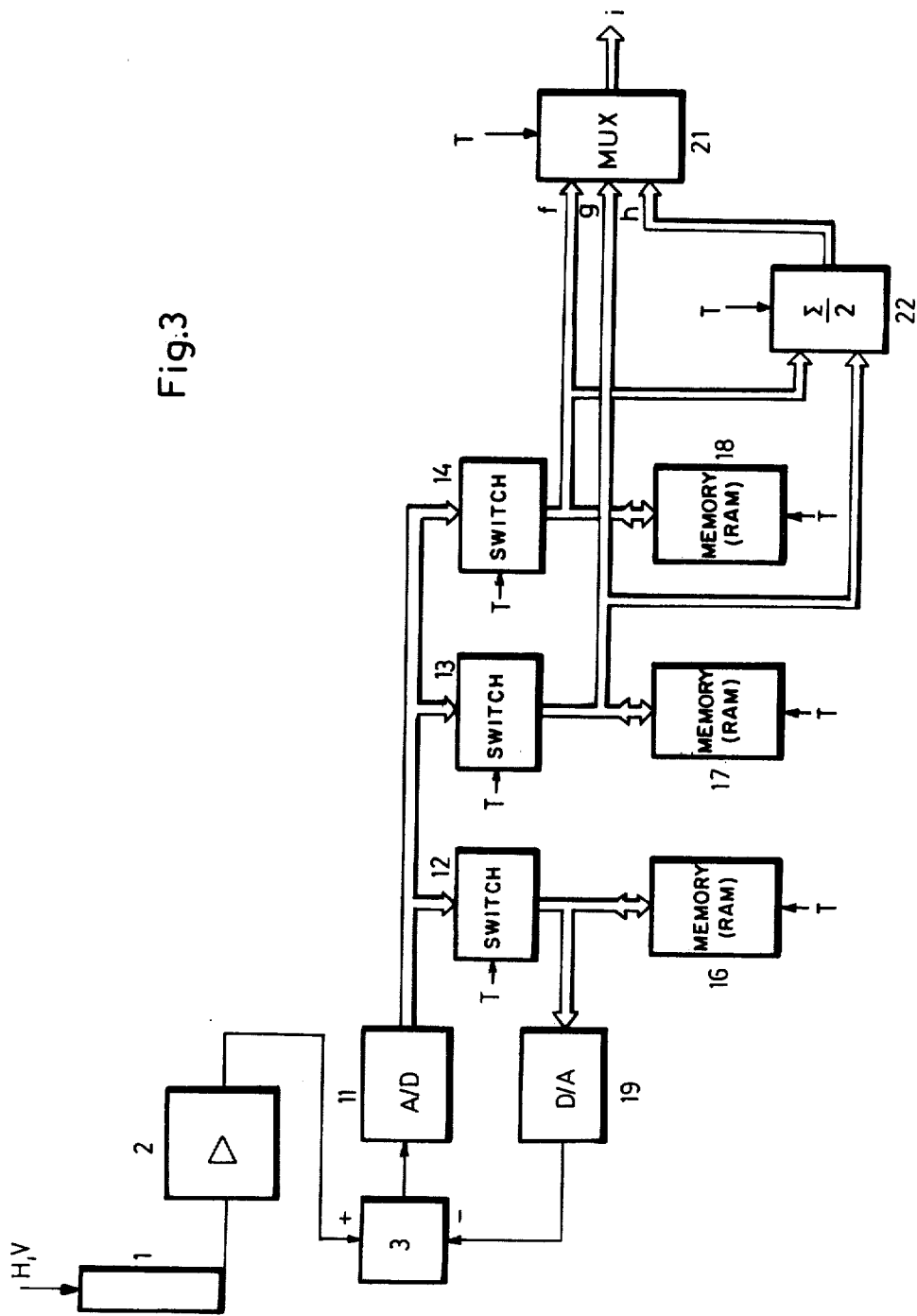

METHOD AND CIRCUIT FOR READING-OUT DATA FROM A TELEVISION PICKUP (IMAGE SENSOR)

The invention relates to a method for reading out data from a television pickup designed for the 525 line standard of American television.

BACKGROUND AND PRIOR ART

Solid state TV pickups, for example CCD's (Charge Couples Devices) or CID's (Charge Injection Devices) are presently available only for the American television "NTSC" standard as regards the number of lines and frames.

In order to use these solid state TV pickups for the CCIR standard having 625 lines, it would be possible to omit a suitable number of lines at the upper and at the lower picture margin, respectively. Since the number of visible lines in a frame according to the American standard is 487, whereas the corresponding number for a frame is 575 in the CCIR standard, 44 lines would be missing at each of the upper and the lower picture margins in the full frame, i.e., 22 lines in each field.

In order to preserve the overall image ratio of 4:3, it is necessary to perform a reduction and lateral redistribution of the picture dots in each line, which results in corresponding black margins at the picture sides. Altogether, the resulting picture would be 15% smaller in each its dimensions and would thus be unsatisfactory.

THE INVENTION

It is a principal object of the present invention to provide a method for utilizing a 525 line TV pickup with a 625 line standard while preserving dimensional integrity i.e., without visible dark margins and in normal size.

A solid state TV pickup having 244 lines, which is operated in the American standard by the line interlace process in such a manner that each is scanned twice to obtain a full frame having 487 lines, can be used to obtain a picture having 569 lines (284 lines in the first field, 285 lines in the second field) by performing an additional repetition (third scan) of every third line. Compared to the required 575 lines, there remains a shortage of only 6 lines, which are not visible on a home receiver. The additional repetition of each third scan line causes a periodic, geometric fault in the vertical direction; however, this fault causes little disturbance to the color information, for example.

In a particularly advantageous feature of the invention, the interlace error is minimized by forming the arithmetic average of each initially read out line (with video information) and the preceding initially read out line (with video information), with the exception of the line (with video information) which follows every third scan line.

The invention will now be described in detail by means of two exemplary embodiments illustrated in the drawing.

THE DRAWING

FIG. 1 is a part of the scanning scheme according to the invention;

FIG. 3 is a block circuit diagram for digital TV signal processing.

DESCRIPTION OF THE PREFERRED EMBODIMENTS

Figure 2:
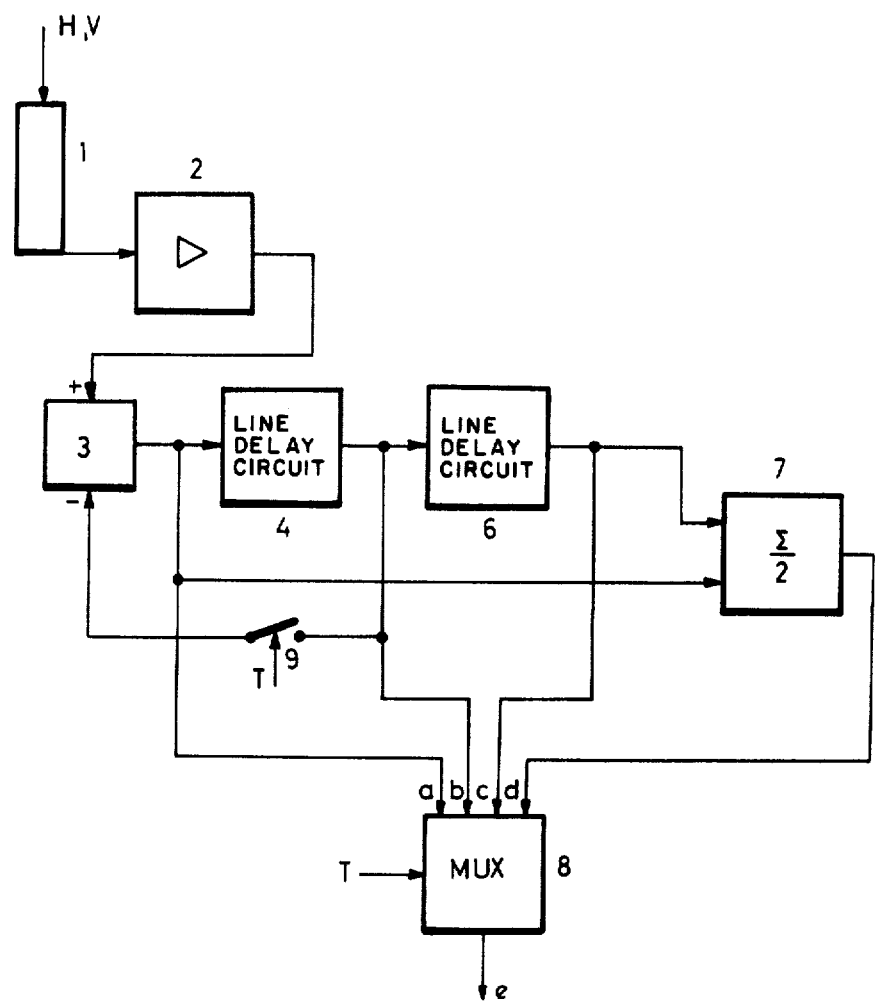
FIG. 2 is a block circuit diagram for analog-type TV signal processing.

Column 1 of FIG. 1 lists the upper 30 lines of the reproduced full frame; the first 3 lines are omitted.

Columns 2 and 3 show the scanned lines of the first and second field, respectively. The numbers within the circles identify lines from which video information or noise (blank) information is being derived. The numerals in the squares refer to lines being scanned for the second time, i.e lines containing only noise information. This read-out method is common to CID pickups.

Finally, the numerals within the triangles indentify those pickup lines which, according to the invention, are read-out for the third time, and likewise contain only the noise signal.

Columns 4 and 5 contain the output lines of the first and second field, respectively, after signal processing in the circuit according to FIGS. 2 or 3, respectively. The numbers within the diamonds identify a preceding line supplementarily added to a read-out line in order to diminish the interlace error, and from which the arithmetic average value is formed.

The diagrams shows that every third line is repeated not once, but twice. For example, the lines 5 and 11 of the first field, are scanned three times, resulting in a 7-line cycle.

During reproduction, for example after PAL integration, in the receiver, and without the supplementarily added line the 7-line cycle has two lines being repeated once, and one line is being repeated twice, whereas, by including the supplementarily added line according to the invention, only the seventh line represents a repetition of the sixth line, (see column 6), thus reducing the interlace error. An analog-type circuit for implementing the method of the invention is depicted in FIG. 2.

A solid state TV pickup (image sensor) 1 is connected via an input amplifier 2 to the positive input of a subtraction stage 3. Two line delay circuits 4 and 6 are connected in series to the output of stage 3. The output of the second line delay circuit 6 is connected to one input of a circuit 7 serving to form the arithmetic average value; the output of stage 3 is connected to the other input of circuit 7. The output of stage 3 and those of the line delay circuits 4 and 6 as well as that of the circuit 7 are each connected to different ones of the inputs of a multiplexer 8. A video signal corresponding to the data of columns 4 and 5 in FIG. 1 is present at the output of the multiplexer 8.

The output of the line delay circuit 4 is also connected via a switch 9 to the negative input of stage 3.

The functioning of this circuit arrangement will now be explained in greater detail with the aid of lines 7 to 11 of the first field, as depicted in FIG. 1.

The video information of the initially scanned line 7 of the solid state TV pickup (image sensor) 1 is amplified to the input amplifier 2 and is passed via the stage 3 to the input of the multiplexer 8 and to the first line delay circuit 4. The video information of the line 7 is thus present at the output of multiplexer 8. During the second scanning of line 7, only noise information can be obtained from this line; it is also amplified in the amplifier 2 and passes via stage 3 to the first line delay circuit 4.

While these date are read into the first line delay circuit 4, the video information of line 7 stored therein is supplied to the input b of the multiplexer 8 and is also read into the second line delay circuit 6. The video information of line 7 is thus once more present at the output of the multiplexer 8. Subsequently, the line 9 is initially scanned, and its video information passes via the amplifier 2 and the stage 3 to one of the inputs of stage 7 and into the first line delay circuit while the noise information of line 7 contained therein is simultaneously read out and passes via the now-closed switch 9 to the negative input of stage 3, thereby compensating for the noise signal components of line 9. At the same time, the video information of line 7 stored in the second line delay circuit 6 is transferred to the other input of the stage 7, whose output thus carries the average value of the video signals of lines 7 and 9. This average signal is applied to the input d of the multiplexer 8 and becomes available at its output e.

During the second read-out of line 9, the noise information contained therein is conducted via the amplifier 2 and the stage 3 to the first line delay circuit 4. During the write-in of the noise signal, the stored video information of line 9 is simultaneously read out and is conducted to the input b of the multiplexer 8 as well as to the second line delay circuit 6. The video information of line 9 is thus available at the output e of multiplexer 8.

Subsequently, the line 11 is read out for the first time and its video information passes via the amplifier 2 and the stage 3 to one of the inputs of stage 7 as well as to the first line delay circuit 4. A noise signal compensation takes place in the stage 3 with the aid of the noise signal of line 9 stored in the first line delay circuit 4. Simultaneously, the video information of line 9 stored in the second line delay circuit 6 is conducted to the other input of the stage 7, whose output carries the average value of the video signals of lines 9 and 11. This average signal is conducted to the input d of the mutliplexer 8, and becomes available at its output e. During a second read-out of line 11, its noise information is conducted via the amplifier 2 and the stage 3 to the first line delay circuit 4. During this write-in, the stored video information of line 11 is simultaneously read out and passes to the input b of the multiplexer 8 as well as to the second line delay circuit 6. The video information of line 11 thus becomes available at the multiplexer output e.

The line 11 is now read out for the third time, and its noise information is once again conducted via the amplifier 2 and the stage 3 to the line delay circuit 4. Simultaneously, the noise signal stored in the line delay circuit 4 is conducted to the line delay circuit 6, and the video information of line 11 stored in the circuit 6 is read out and conducted to the input c of the multiplexer 8. The video information of line 11 thus once again becomes available at the output e of multiplexer 8.

The above described 7-line cycle now repeats itself until the read-out of the first field is completed, after which follows the read-out of the second half-frame.

The sequencing of the multiplexer 8 as well as the control of the switch 9 is based on pulses T, which are generated by a clock pulse generator not shown.

In a circuit for digital processing of the TV signal, shown in FIG. 3, the solid state TV pickup (image sensor) 1 is similarly connected via an input amplifier 2 to the positive input of a subtraction stage 3. An A/D (analog to digital) converter 11 is connected to the output of stage 3, and the outputs of converter 11 are connected to three tri-state switches 12, 13, 14.

Digital line storage circuits 16, 17, 18 for example RAM's, are connected to respective outputs of the tri-state switches 12, 13, 14.

The input and output of the line storage circuit 16 are are connected via a D/A (digital-to-analog) converter 19 to the negative input of the stage 3. The inputs and outputs of line storage circuits 17 and 18 are connected, respectively, to inputs g, f of a multiplexer 21 and to respective inputs of a stage 22 which computes the arithmetic average value.

The output of the stage 22 is connected to a third input h of the multiplexer 21, and a digital video signal corresponding to columns 4 and 5 of FIG. 1 is available at the output i of the multiplexer 21.

The signals read out from the solid state TV pickup (image sensor) 1 are amplified in the amplifier 2 and pass via the subtraction stage 3 to the A/D converter 11, where the now digitized signals are available at the output These digitized signals are treated in the manner already indicated by FIG. 2, and according to the scheme shown in FIG. 1.

The storage circuit 16 stores the noise signals of the repeatedly read out lines during a first (conducting) switching state of the tri-state switch 12, and the circuit 16 once again releases these signals during a second (blocked switching state via the D/A converter 19, whence they proceed as analog signals to stage 3 for the purpose of noise signal compensation.

Storage circuits 17 and 18 store the video information of successively read out lines during a first (conducting) switching state of the tri-state switch 13 and 14 respectively, and once again release them during a second (blocked) switching state of the tri-state switches 13 and 14 respectively, according to columns 4 and 5 of FIG. 1 either directly to the multiplexer 21, or to the stage 22 for the formation of an average value and thereafter to the multiplexer 21.

In addition, it is possible to conduct the video signal directly from the A/D converter 11 via the tri-state switch 13 or 14 to the multiplexer 21 (for example, the first scanning of line 7), so that the corresponding video signal according to column 4 and 5 of FIG. 1 is available in digitized form at the output i of the multiplexer 21.

The control of the circuits 12 to 14, 16 to 18, as well as 21 and 22 results from control pulses T which are derived from the H-pulses by means of a clock pulse generator (not shown).

We claim:

1. A method for reading out data from a TV pickup (image sensor) designed for a 525line standard, in compatibility with a 625-line standard user system, wherein, according to the invention,
every third line scan of said pickup is repeated twice.

2. A method according to claim 1, wherein the twofold repetition of each third line scan is obtained by a triple read-out of said third lines.

3. A method according to claim 1, wherein the double repetition of every third scan line is achieved by means of the electronic storage of delay of the line data being read out for the second time.

4. A method according to claim 1, wherein said TV pickup (image sensor) is scanned according to the interlace scanning principle, odd-numbered lines being initially read out for the first field with a single repetition of each line scan and with a second repetition of every third line scan whereafter the even-numbered lines are read out for the second field with a single repetition of each line scan and a second repetition of every third line scan, whereafter said fields are interlaced and assembled into a frame.

5. A method according to claim 1, wherein said TV pickup (image sensor) is scanned according to the image-organized principle, in which initially all lines are read out once and every third line is read out twice for the first field, whereafter all lines are again read out and every third scan line is read out twice for the second field, whereafter said half-frames are interlaced and assembled into a frame.

6. A method according to claim 1, wherein there is formed the arithmetic average value of each initially read-out line (with video information) and of the preceding initially read out line (with video information), with the exception of the line (with video information) which follows the third scan line, whereby interlace errors are diminished.

7. A circuit (FIG. 2) for reading out data from a TV pickup (image sensor) (1) having an output connected via two series-connected line delay circuits (4, 6) to one input of a circuit (7) for forming an arithmetic average value and further connected directly to another input of said circuit (7), and wherein the output of the TV pickup (image sensor), the output of each of said delay circuits (4,6), and that of the circuit (7) for the formation of the arithmetic average value, are connected, respectively, to the inputs (a, b, c, d) of a multiplexer (8) at whose output (e) is present a video signal according to a 265-line standard.

8. A circuit according to claim 7, comprising a subtraction stage (3) connected between the output of the TV pickup (image sensor) (1) and the input of the first line delay circuit (4) for the purpose of noise signal compensation, the negative input of the subtraction stage (3) being connectable by means of a switch (9) to the output of the first line delay circuit (4).

9. A circuit (FIG. 3) for reading out data from a TV pickup (image sensor) (1) having an output connected to an A/D converter (11), and including two line storage circuits (17, 18) for storing respective video signals, the outputs of the A/D converter (11) being connected to said line storage circuits (17, 18) by tri-state switches (13, 14), respectively, and the outputs of said line storage circuits (17, 18) being connected firstly to a circuit (22) for forming an arithmetic average value, said circuit (22) being connected to one input of a multiplexer (21) and being connected secondly directly to other inputs of said multiplexer (21), and the output (i) of the multiplexer (21) being connected to a D/A converter (19) at whose output the video signal is present in a 625-line standard.

10. A circuit according to claim 9, wherein, for the purpose of noise signal compensation, an additional line storage circuit (16) is provided to store a noise signal of one line, said storage circuit (16) being connected via a tri-state switch (12) to the output of said A/D converter (11), and the output of the additional line storage circuit (16) being connected via a D/A converter (19) to the negative input of a subtraction stage (3) connected between the TV pickup (image sensor) (1) and said A/D converter (11).

11. A solid state TV pickup (image sensor) operated in accordance with the method recited in claim 1 and as a component of a color television camera for sensing color information.

* * * * *